United States Patent
Knierim et al.

[11] Patent Number: 6,049,393
[45] Date of Patent: Apr. 11, 2000

[54] METHOD FOR ENHANCING RESOLUTION IN A PRINTED IMAGE

[75] Inventors: David L. Knierim, Wilsonville; A. J. Rogers, West Linn, both of Oreg.

[73] Assignee: Tektronix, Inc., Wilsonville, Oreg.

[21] Appl. No.: 08/974,578

[22] Filed: Nov. 19, 1997

[51] Int. Cl.[7] ................................................ G06K 15/00
[52] U.S. Cl. .............................................. 358/1.2; 358/1.9
[58] Field of Search .................................. 395/101, 102, 395/109, 117; 347/5, 9, 15; 358/298, 443, 448, 455, 456, 502, 1.1, 1.2, 1.9, 1.7; 345/428, 429; 382/163, 209, 217, 257, 277, 299, 308

[56] References Cited

U.S. PATENT DOCUMENTS

| | | | |
|---|---|---|---|
| 4,259,694 | 3/1981 | Liao | 358/283 |
| 5,029,108 | 7/1991 | Lung | 364/519 |
| 5,045,952 | 9/1991 | Eschbach | 358/447 |
| 5,327,260 | 7/1994 | Shimomae et al. | 358/448 |
| 5,353,387 | 10/1994 | Petschick et al. | 395/109 |
| 5,390,290 | 2/1995 | Hayashi et al. | 395/109 |
| 5,396,584 | 3/1995 | Lee et al. | 395/132 |
| 5,502,792 | 3/1996 | Chen et al. | 395/108 |
| 5,502,793 | 3/1996 | Ng | 395/109 |
| 5,515,479 | 5/1996 | Klassen | 395/109 |
| 5,519,815 | 5/1996 | Klassen | 395/109 |
| 5,574,832 | 11/1996 | Towery et al. | 395/109 |
| 5,588,094 | 12/1996 | Kroon | 395/109 |
| 5,677,714 | 10/1997 | Klassen | 347/9 |
| 5,684,933 | 11/1997 | Nagafusa | 395/109 |
| 5,706,414 | 1/1998 | Pritchard | 395/117 |
| 5,719,601 | 2/1998 | Moore et al. | 347/9 |
| 5,742,300 | 4/1998 | Klassen | 347/9 |
| 5,767,870 | 6/1998 | Klassen et al. | 347/9 |

*Primary Examiner*—Arthur G. Evans
*Attorney, Agent, or Firm*—Charles F. Moore; Francis I. Gray; Ralph D'Alessandro

[57] ABSTRACT

A method for increasing resolution in a image printed by an ink jet printer is provided. The method selectively removes painted pixels from a bit map to ensure that no two adjacent pixels are painted by the same ink jet. The method removes painted pixels in a manner that preserves the edges of characters and other features. The resulting processed bit map ensures that an individual print head jet always addresses at least one non-painted/blank pixel after each painted pixel it fills. This allows the speed of the receiving surface relative to the print head to be increased to thereby allow for greater resolution in the printed image for a given print time.

13 Claims, 5 Drawing Sheets prefers full c
nochromed

FIG.6a prefers full c
nochromed

FIG.6b

METHOD FOR ENHANCING RESOLUTION IN A PRINTED IMAGE

FIELD OF INVENTION

This invention relates to a method of ink jet printing and, more specifically, to a method of increasing resolution in a printed image without increasing print time or requiring a smaller dot size.

BACKGROUND OF INVENTION

The field of ink jet printing is replete with references describing solutions to problems associated with placing ink drops on a print media. In particular, color ink jet printing requires careful placement of ink drops to meet print resolution and color fidelity requirements without producing undesired printing artifacts such as banding, streaking, bleeding, puddling, and chroma shifting.

Ink-jet printing systems commonly utilize either direct printing or offset printing architecture. In a typical direct printing system, ink is ejected from jets in the print head directly onto a final receiving medium. In an offset printing system, the print head jets the ink onto an intermediate transfer surface, such as a liquid layer on a drum. The final receiving medium is then brought into contact with the intermediate transfer surface and the ink image is transferred and fused to the final receiving medium.

Many ink jet printers include a control software driver program (hereinafter "printer driver") for handling various aspects of the printing operation. Such printer drivers are often interfaced to a page description language, such as the PostScripts® language available from Adobe Systems, Inc., Mountain View, Calif. The page description language generates a bit map that represents the image to be printed. The page description language also typically includes methods for manipulating text and graphics, selecting media sizes, types, trays, and the number of copies to be printed.

Ink jet printers generally utilize a single ink dot size for printing an image on a receiving medium. In single dot size printing, the average reflectance of a region of an image is typically modulated by a process referred to as "dithering," in which the perceived intensity of an array of dots is modulated by selectively printing the array at a predetermined dot density. For example, if a 50 percent local average reflectance is desired, half of the dots in the array are printed. A particular type of dithering is digital halftoning, also known as "spacial dithering." Digital halftoning refers to a process of arranging binary picture elements or "pixels" to create the illusion of continuous-tone images.

It is known to utilize image processing techniques to increase printer addressability and thereby enhance resolution. However, the prior art techniques for increasing resolution have generally required reducing ink drop size, increasing the number of jets on the print head, increasing the jet firing rate (the number of drops ejected per second) and/or increasing overall print time. The smaller drop requirement can be mitigated by removing selected ink drops from the interior of solid fill shapes, including text and thick lines. This process, often referred to as decimation, preserves the smoothness of the edges of the solid filled shapes without requiring excessive ink. However, decimation still results in increased print time for a print head with a given firing rate and a fixed number of jets. Accordingly, a need exists for a method of increasing image resolution without requiring a smaller dot size or a faster print head jet firing rate, and without increasing print time.

SUMMARY OF THE INVENTION

It is an aspect of the present invention to provide an improved method of increasing the resolution in an image printed on a receiving surface and represented by a plurality of pixels in a bit map.

It is another aspect of the present invention that the method increases addressability and apparent resolution without requiring a reduction in drop size or an increase in print time.

It is a feature of the present invention that the method insures that no two vertically adjacent pixels are painted by the same jet.

It is another feature of the present invention that the method only removes painted pixels and does not add pixels that the page description language has not already set.

It is an advantage of the present invention that the method preserves the edges of characters and lines.

It is another advantage of the present invention that the method preserves the visibility of single-pixel-wide dark lines, single-pixel-wide white features and two-pixel-high dark features.

To achieve the foregoing and other aspects, features and advantages, and in accordance with the purposes of the present invention as described herein, an improved method for enhancing resolution in a printed image is provided. The method manipulates a bit map to selectively remove painted pixels (representing ink drops) from the interior section of solid fill areas. The method removes painted pixels in a manner that preserves the edges of characters and other features. The resulting processed bit map insures that an individual print head jet always addresses at least one non-painted/blank pixel after each painted pixel it fills. This allows the speed of the receiving surface relative to the print head to be increased to thereby allow for greater resolution in the printed image for a given print time.

Still other aspects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive. And now for a brief description of the drawings.

BRIEF DESCRIPTION OF THE DRAWINGS

FIG. 5b is schematic representation of an individual pixel from the bit map of FIG. 5a.

FIG. 6a is an example of characters printed by an offset ink jet printer without utilizing the method of the present invention.

FIG. 6b shows the characters of FIG. 6a printed after the bit map has been processed by the present method.

DETAILED DESCRIPTION OF THE PREFERRED EMBODIMENT

Figure 1:
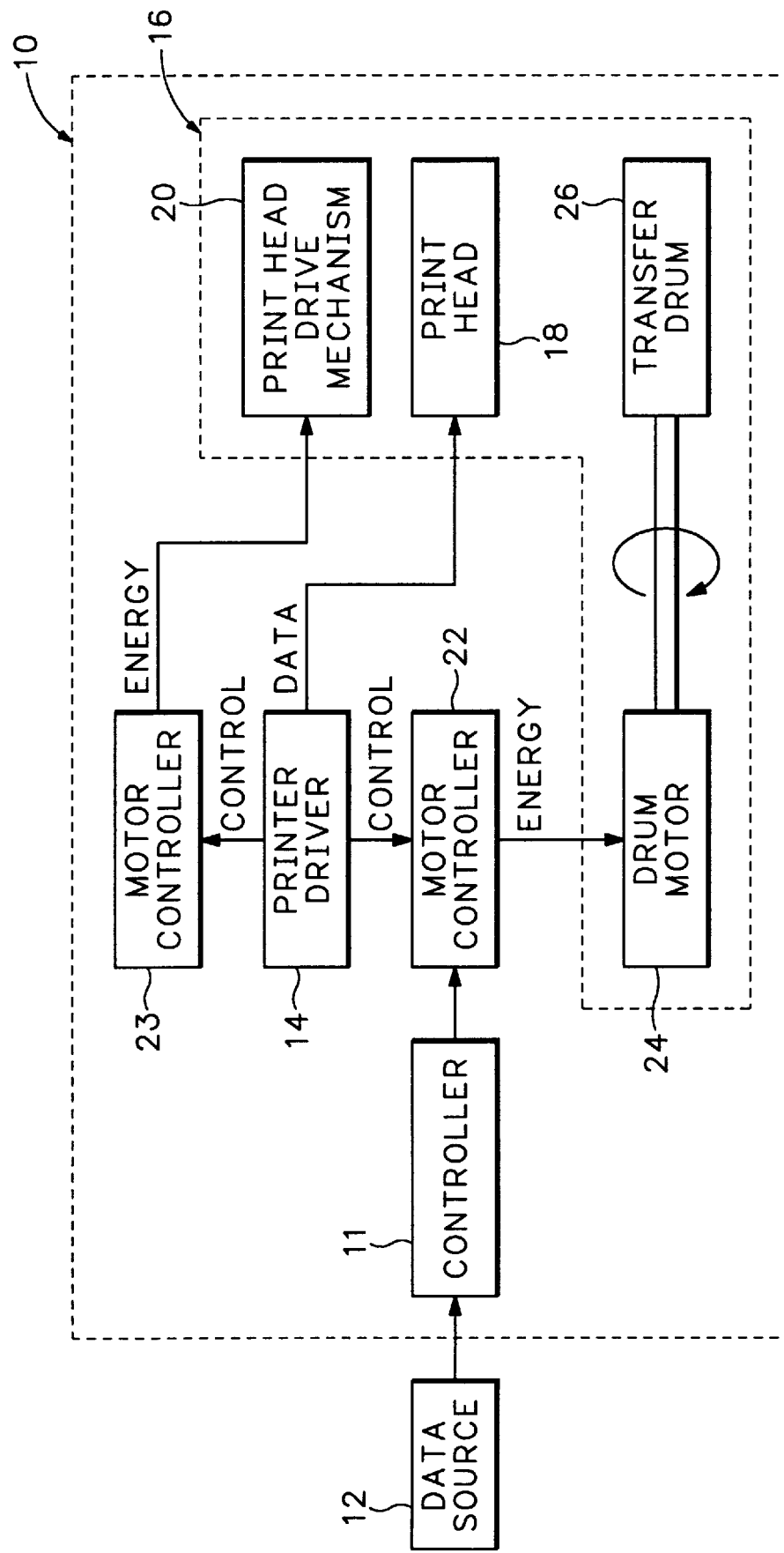
FIG. 1 is a functional block diagram showing the interrelationship among the electromechanical components of an offset ink jet printing apparatus that utilizes the method for enhancing resolution of the present invention.

FIG. 1 is a schematic illustration of an offset ink jet printing apparatus 10 that utilizes the method of improving image resolution of the present invention. An example of this type of offset printer is disclosed in U.S. Pat. No. 5,389,958 (the '958 patent) entitled IMAGING PROCESS and assigned to the assignee of the present application. The '958 patent is hereby specifically incorporated by reference in pertinent part. The following description of a preferred embodiment of the method of the present invention refers to its use in this type of printing apparatus. It will be appreciated, however, that the method of the present invention may be used with various other ink jet printing apparatus that utilize different architectures, such as direct printing apparatus in which ink is jetted directly onto a receiving medium with a shuttling print head, commonly referred to as serial printing. Accordingly, the following description will be regarded as merely illustrative of one embodiment of the present invention.

With continued reference to FIG. 1, the printing apparatus 10 receives imaging data from a data source 12. A processor 11 utilizes a printer driver 14 to process the imaging data and control the operation of print engine 16. The printer driver 14 feeds formatted imaging data to a print head 18 and controls the movement of the print head by sending control data to a motor controller 23 that activates a print head drive mechanism 20. The driver 14 also controls the rotation of the transfer drum 26 by providing control data to a motor controller 22 that activates the drum motor 24.

Figure 2:
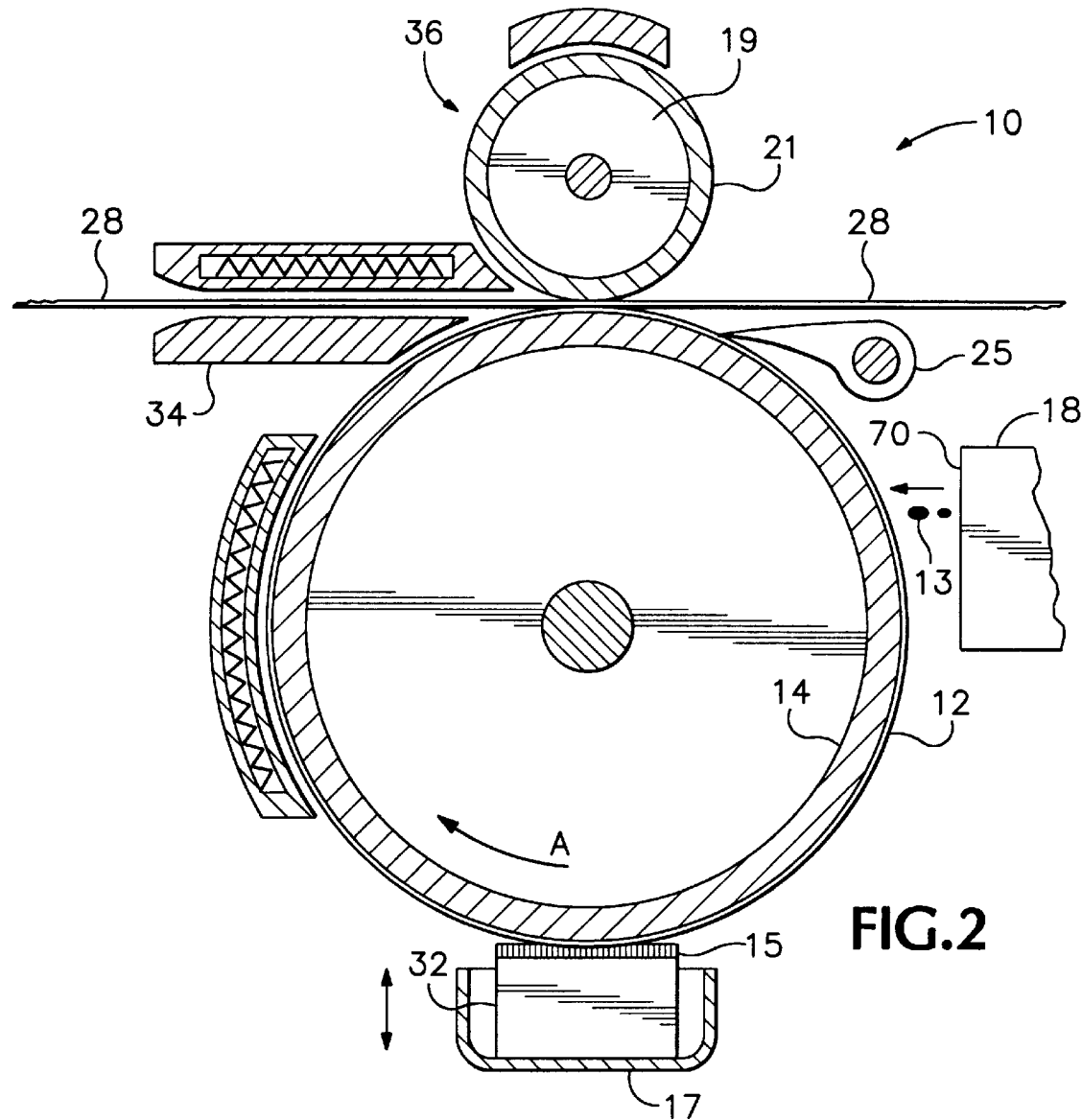
FIG. 2 is a diagrammatic illustration of the offset printing process employed by the apparatus of FIG. 1.
Figure 3:
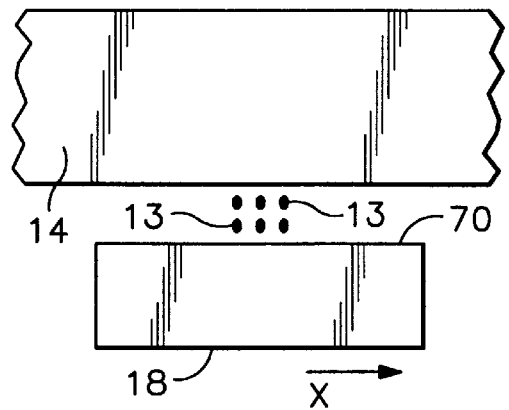
FIG. 3 is a simplified top diagrammatic illustration of the print head translating relative to the receiving surface while jetting liquid ink drops onto the receiving surface.

FIG. 2 discloses a diagrammatical illustration of the printing apparatus 10 of FIG. 1 that is utilized to transfer an inked image from a receiving surface to a final receiving medium. The print head 18 is supported by an appropriate housing and support elements (not shown) for either stationary or moving utilization to place dots or drops of ink 13 in a liquid or molten state on an intermediate transfer surface 12 (the ink drops 13 being greatly exaggerated in size for purposes of illustration). Intermediate transfer surface 12 is a liquid layer that is applied to a supporting surface, which is shown as a drum 14 but could also be a web, platen, or any other suitable design. The intermediate transfer surface 12 is applied by contacting the drum 14 with an applicator, such as a metering blade, roller, web or the shown wicking pad 15 contained within applicator assembly 17. With reference to FIGS. 2 and 3, in the preferred embodiment the drum 14 rotates in the direction of action arrow A as the print head 18 translates in the direction of action arrow X and jets ink drops 13 in raster fashion onto the liquid intermediate transfer surface 12.

The drum 14 may be formed from any appropriate material, such as metals including, but not limited to, aluminum, nickel or iron phosphate, elastomers, including but not limited to, fluoroelastomers, perfluoroelastomers, silicon rubber and polybutadiene, plastics, including but not limited to, polytetrafluoroethylene loaded with polyphenylene sulfide, thermoplastics such as polyethylene, nylon, and FEP, thermosets such as acetals or ceramics. The preferred material is anodized aluminum. Suitable liquids that may be used as the liquid intermediate transfer surface 12 include water, fluorinated oils, glycol, surfactants, mineral oil, silicone oil, functional oils and combinations thereof. The preferred liquid is amino silicone oil. The final receiving medium 28 may be a transparency, paper or other suitable media.

Applicator assembly 17 contains a reservoir and wicking pad 15 for applying the liquid. Wicking pad 15 is preferably formed from any appropriate nonwoven synthetic textile with a relatively smooth surface. A preferred configuration can employ the smooth wicking pad 15 mounted atop a porous supporting material 32, such as a polyester felt. Both materials are available from BMP Corporation as BMP products NR 90 and PE 1100-UL, respectively. Applicator assembly 17 is mounted for retractable movement upwardly into contact with the liquid intermediate transfer surface 12 and the surface of drum 14 and downwardly out of contact with the transfer surface 12 and the drum 14 by means of an appropriate mechanism, such as an air cylinder or an electrically actuated solenoid.

FIG. 2 shows a final substrate guide 34 that passes the final receiving medium 28 from a positive feed device (not shown) and guides it through the nip formed by the opposing arcuate surfaces of a roller 36 and the drum 14. Stripper fingers 25 (only one of which is shown) may be pivotally mounted to the imaging apparatus 10 to assist in removing the final receiving medium 28 from the exposed surface of the liquid layer forming the intermediate transfer surface 12. Roller 36 has a metallic core 19, preferably steel, with an elastomeric covering 21. Suitable elastomeric covering materials include silicones, urethanes, nitrites, EPDM and other appropriately resilient materials. The elastomeric covering 21 on roller 36 engages the final receiving substrate 28 on the reverse side to which the ink 13 is applied to the exposed surface of the liquid layer forming the intermediate transfer surface 12. This fuses or fixes the ink image to the surface of the final receiving medium 28 so that the ink image is spread, flattened and adhered.

Figure 4:
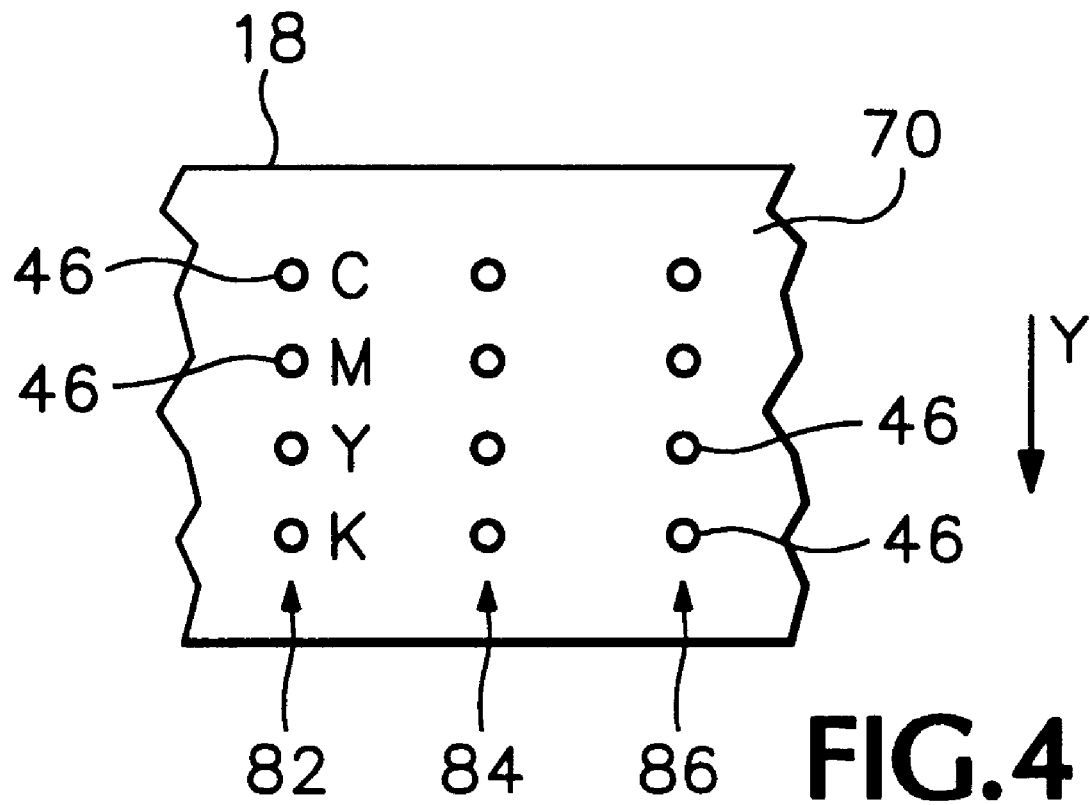
FIG. 4 is an enlarged elevational view of a portion of the print head face showing parallel vertical columns of ink jets, each jet column having from top to bottom a cyan, magenta, yellow and black ink jet.

FIG. 4 illustrates a portion of the face 70 of the print head 18 as viewed from the intermediate transfer surface 12 on the drum 14. Parallel vertical jet columns comprising four ink jets 46 each are located across the face 70. While only three jet columns 82, 84 and 86 are shown, it will be appreciated that the preferred print head 18 utilizes at least 88 jet columns of ink jets 46. Each jet column includes from top to bottom a cyan C, magenta M, yellow Y and black K ink jet 46. In this manner, individual ink droplets of different colors from a single jet column may overlay each other during a scan of the print head 18 to produce a desired color. In the preferred embodiment of print head 18, the black ink jet K in each jet column is offset two pixels to the left, as viewed in FIG. 4, from the other three ink jets Y, M and C above.

With reference to FIG. 1, in operation the printer driver 14 receives data comprising a print job from a data source 12. The print job data takes the form of a bit map that is generated by a page description language, such as the PostScript® language. The printer driver 14 utilizes a PostScript® interpreter to process and format the print job and transmits control and printing data to motor controllers 22, 23 and to the print head 18. As described in more detail below, the printer driver 14 uses the method of the present invention to modify a high resolution PostScript®-generated bit map and create a processed bit map that allows printing at the same drop size as would otherwise be utilized for a lower resolution bit map.

The following description of the method of the present invention is presented with reference to a single color plane.

It will be appreciated that for color printing the present method may be applied independently to each of a plurality of color planes.

Figure 5B:
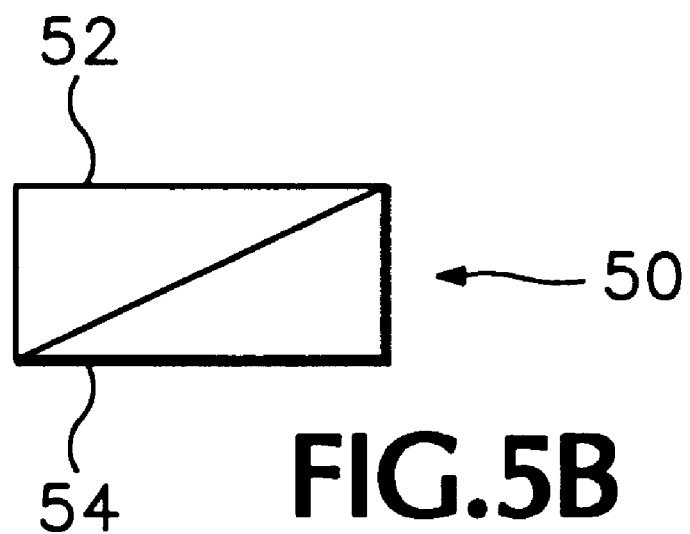

The PostScript® language generates a bit map at a given resolution, for example 450×800 dpi (17.7×31.5 dots per mm), that represents the image to be printed. FIG. 5 illustrates a portion of the upper left corner of a PostScript®$_{13}$ bit map. The bit map is composed of a plurality of pixels 50 that are arranged in non-overlapping single-pixel-wide pixel columns, with portions of pixel columns 60, 62 and 64 being shown in FIG. 5. The rows are arranged side-by-side in an X-direction. For purposes of describing the present method, the pixel columns are numbered consecutively with an X-coordinate to indicate their horizontal position in the bit map. Thus, pixel columns 60 and 64 are odd-numbered columns and pixel column 62 is an even-numbered row. The pixels 50 in each pixel row are shown as being in either a first state 1 or a second state 0, the first state 1 representing an ink drop and the second state 0 representing no ink drop. The pixels 50 are also designated as either "A" position pixels or "B" position pixels based on the position of the pixel within the column and whether the column is an odd-numbered column or an even-numbered column. The pixel columns extend in a Y-direction and the individual pixels 50 in each column may be identified by their X and Y coordinates. For example, pixel $A_{11}$ refers to the pixel in position X1, Y1 in pixel column 60; pixel $B_{14}$ refers to the pixel in position X1, Y4 in pixel row 60; pixel $A_{37}$ refers to the pixel in position at X3, Y7 in pixel row 64; and so forth. Additionally, FIG. 5 illustrates that all of the "A" position pixels are located in odd Y-coordinate locations in odd X-coordinate pixel columns and in even Y-coordinate pixel locations in even X-coordinate pixel columns. It follows that "B" position pixels are located in even Y-coordinate locations in odd X-coordinate pixel columns, and in odd Y-coordinate locations in even X-coordinate pixel columns. Alternatively expressed, the pixel columns are positioned side-by-side and alternate between odd-numbered columns and even-numbered columns, with each of the columns having an odd Y-coordinate first pixel location and alternating thereafter between even and odd Y-coordinate pixel locations.

As referenced above, a broad objective of the present invention is to increase the resolution of a printed image without reducing drop size or increasing print time. As explained in more detail below, the method of the present invention achieves this objective by manipulating the PostScript®-generated bit map to selectively remove approximately one-half of the pixels filled with ink drops, hereinafter referred to as "1 bits," from solid fill areas of the bit map before printing. More particularly, the interior section of each solid fill area is decimated to a checkerboard pattern, so that on average one-half of the 1 bits in the solid fill areas are printed. The preferred embodiment also incorporates a halftone screen that is aligned to this checkerboard pattern to prevent discontinuities between solid and shaded areas.

With reference now to FIG. 4, each jet 46 on the face 70 of print head 18 ejects drops of ink at a fixed firing rate, for example 8 Khz. With a fixed firing rate, the resolution of the printed image in the Y-direction is determined by the speed with which the receiving surface, in this case the liquid intermediate transfer surface 12, is moved past the print head jets 46. The method of the present invention allows for an increase in resolution in the Y-direction by ensuring that no two vertically adjacent pixels 50 in a pixel column of the bit map are painted with the same primary color (C, M, Y or K).

Alternatively expressed, the present method manipulates the PostScript®-generated bit map to ensure that no single jet 46 is required to deposit an ink drop on vertically adjacent pixels. In this manner, a given jet 46 in the print head 18 always addresses at least one blank/non-painted pixel, hereinafter referred to as a "0" bit, after each 1 bit painted pixel in a pixel column. It follows that the speed of the receiving surface in the Y-direction relative to the print head 18 may be increased two-fold as compared to the Y-direction speed required for a given jet 46 at the fixed firing rate to address vertically adjacent pixels. The present method thereby doubles the resolution in the Y-direction while maintaining the fixed firing rate. Because each individual jet 46 is never required to place an ink drop on vertically adjacent pixels, each jet never exceeds the fixed firing rate. Additionally, and an important aspect of the present invention, the present method allows this increase in speed while also preserving pixels along the edges of characters in the bit map.

The operation of the method of the present invention will now be described. As explained above, the present method manipulates a bit map to remove approximately one-half of the 1 bits (painted pixels) from the solid fill areas of the bit map before printing. The present method thereby generates a processed bit map in which no two vertically adjacent pixels in a column are 1 bits. FIG. 5 represents a portion of the upper left corner of a PostScript®-generated bit map prior to processing by the present method. To determine which 1 bit pixels to remove from the bit map, the present method examines each pixel in the column and its adjacent pixels in the column. For efficient implementation, the present method processes one pixel column at a time without requiring information from adjacent pixel columns. Additionally, the present method only removes painted pixels, or changes 1 bits to 0 bits, and never adds 1 bits that the PostScript® language has not already included in the bit map.

With reference to FIG. 5, each pixel 50 in each pixel column is designated "1" for a 1 bit or "0"for a 0 bit. To determine which 1 bits to remove and which to leave set, the present method determines whether a given pixel satisfies one or more of several conditions. Firstly, the present method determines whether a pixel under examination is on an edge of a character (an "edge pixel"). An edge pixel is defined as a 1 bit pixel that is between at least two 1 bit pixels and two 0 bit pixels. In the bit map of FIG. 5, pixel $B_{16}$ in pixel row 60 is an edge pixel. Edge pixels are maintained as 1 bit pixels to preserve the edges of the characters in the image.

As mentioned above, the present method removes or decimates approximately one half of the 1 bit pixels from the interior section of each solid fill area. The interior section of a solid fill area is defined as a 1 bit pixel that is between at least two 1 bit pixels and two 1 bit pixels. In FIG. 5, pixels $B_{23}$, $A_{24}$, $B_{25}$ and $A_{26}$ in pixel column 62 form an interior section of a solid fill area. To decimate the solid fill areas, every other pixel in an interior section of a solid fill area is designated as a restricted pixel that cannot be changed to a 0 bit pixel. The non-restricted pixels in the interior section are then changed to 0 bit pixels. To create the checkerboard pattern in solid fill areas, the restricted pixels are limited to odd Y-coordinate pixel locations in odd numbered pixel column, such as pixel $A_{33}$ in pixel column 64, and to even Y-coordinate pixel locations in even numbered pixel columns, such as pixel $A_{24}$ in pixel column 62. It will be appreciated that the "A" and "B" designations for each pixel 50 in the pixel columns of FIG. 5 correspond to whether that particular pixel 50 would be designated a restricted pixel if it were located in an interior section of a solid fill area, such that all "A" pixels located in an interior section are restricted pixels.

To preserve single-pixel wide dark lines, the present method maintains any isolated 1 bit pixels. An isolated 1 bit pixel is defined as any 1 bit pixel that is between at least two 0 bit pixels and at least two 0 bit pixels. In FIG. 5, pixel $A_{19}$ is an isolated 1 bit pixel and would not be changed to a 0 bit pixel.

To provide a smooth transition from a solid fill area to a lighter shade area created by the halftone screen, the present method maintains any "A" position 1 bit pixels that are between at least one 0 bit pixel and one 0 bit pixel. Thus, in odd numbered pixel columns the 1 bit pixels in odd Y-coordinate positions are maintained if they are between at least one 0 bit pixel and one 0 bit pixel. In even numbered pixel rows the 1 bit pixels in even Y-coordinate positions are maintained if they are between at least one 0 bit pixel and one 0 bit pixel. In pixel column 64, pixel $A_{37}$ would be maintained as a 1 bit pixel in accordance with this provision of the present method. This provision combines with the provisions for decimating the interior of solid fill areas to prevent the alteration of areas having a lighter shade than solid fill, and thereby assure a smooth transition from a solid fill area to a halftoned lighter shade area.

Figure 5A:
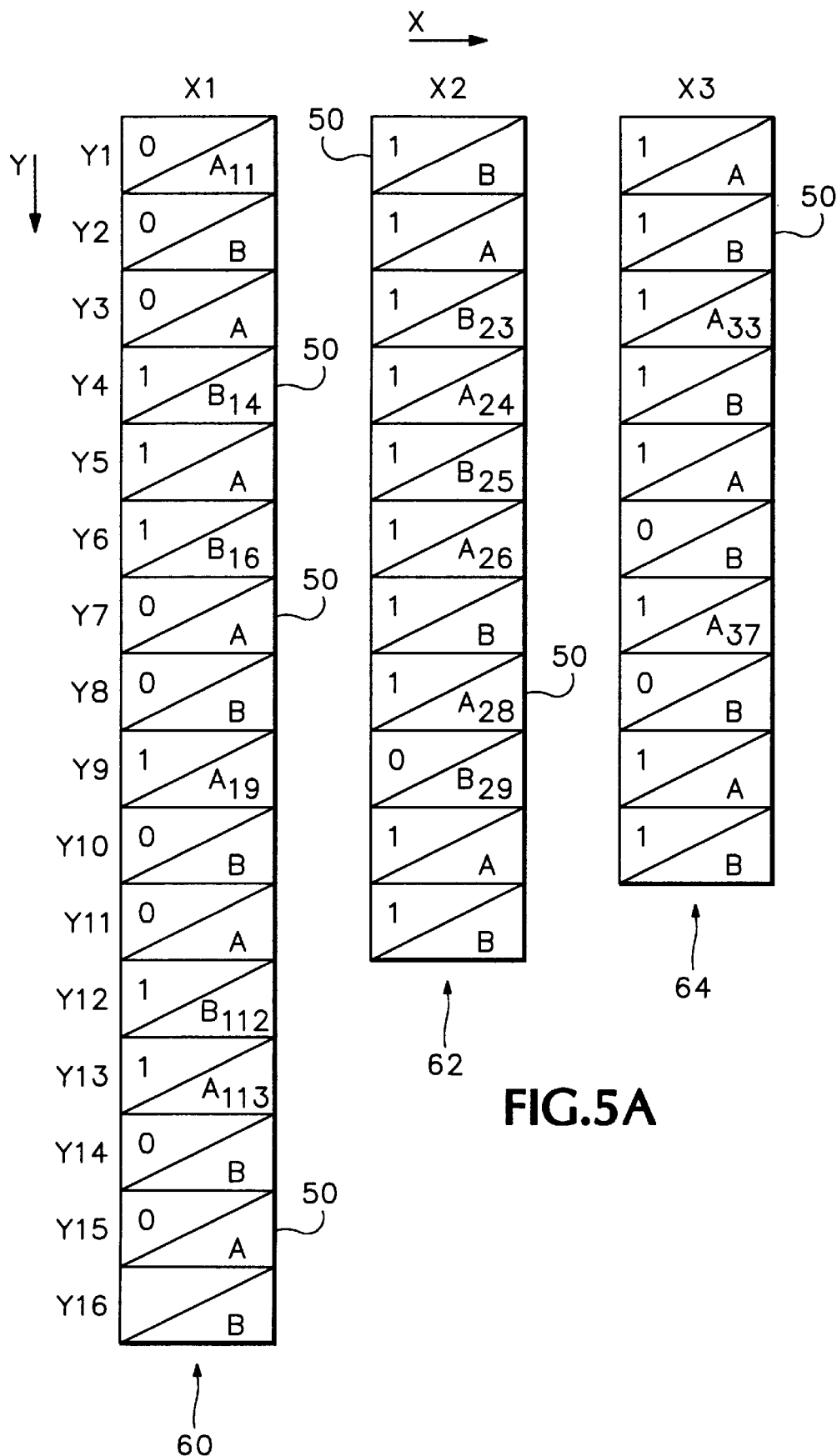
FIG. 5a is a schematic representation of a portion of a bit map showing pixels arranged in parallel vertical pixel rows, each pixel having an X- and a Y-coordinate location that represents a particular pixel row and the position of the pixel within that pixel row.

The present method also contains provisions for preserving the visibility of single pixel white features, defined as a single 0 bit pixel between at least two 1 bit pixels and two 1 bit pixels. If the 0 bit pixel is in a "B" position, the "A" position 1 bit pixel immediately above it is changed to a 0 bit pixel. Alternatively expressed and with reference to FIG. 5a, each pixel 50 may be described as having a first side or top 52 and a second side or bottom 54. If a 1 bit pixel is in either an odd Y-coordinate pixel location in an odd numbered pixel column or an even Y-coordinate pixel location in an even numbered pixel column (an "A" position), the 1 bit pixel is changed to a 0 bit pixel if the 1 bit pixel has at least one neighboring 1 bit pixel immediately above or adjacent to its first side 52, the 1 bit pixel has one neighboring 0 bit pixel immediately below or adjacent to its second side 54, and the one neighboring 0 bit pixel has at least two 1 bit pixels immediately below or adjacent to its second side. In FIG. 5, pixel $B_{29}$ is an isolated 0 bit pixel. Since pixel $B_{29}$ is in a "B" position, the "A" position 1 bit pixel $A_{28}$ immediately above it would be changed to a 0 bit pixel by the present method.

The present method also contains provisions for preserving the visibility of two-pixel-high dark features, defined as two adjacent 1 bit pixels between two 0 bit pixels and two 0 bit pixels. In this situation, the "A" position pixel of the two 1 bit pixels will be maintained. Alternatively expressed, a 1 bit pixel that is in either an odd Y-coordinate pixel location in an odd numbered pixel column or an even Y-coordinate pixel location in an even numbered pixel column will be maintained if the 1 bit pixel is between one neighboring 1 bit pixel and at least two neighboring 0 bit pixels, and the one neighboring 1 bit pixel is adjacent to at least two 0 bit pixels. In FIG. 5, pixels $B_{112}$ and $A_{113}$ comprise a two-pixel-high dark feature. Thus, this provision ensures that pixel $A_{113}$ is maintained as a 1 bit pixel.

FIG. 6a is an example of characters printed without utilizing the method of the present invention, the characters being pixel replicated by a factor of 8:1 in each dimension to make the individual dots visible. FIG. 6b is an example of the same characters printed after the bit map has been processed by the present method.

For execution speed, in the preferred embodiment the present method is executed by utilizing a logic equation comprising a sequence of AND, OR and NOT operations on 32 pixels (bits) at a time. The preferred logic equation is: output_bit=input_bit & ((mask & ~(a1 & (~b1 & b2 & b3 #b1 & (~b2 & (~b3 #~a2) #b2 & ~a2 & ~a3)))) #(~mask & (~a1 & ~a2 & (~b1 #b1 & b2) #a1 & a2 & ~b1 & (~b2 #~a2)))); where the input_bit is the pixel under examination as generated by the PostScript® program, the output_bit is the same pixel bit after processing by the present method, the "~" symbol is NOT, the "#" symbol is OR, the "&" symbol is AND, mask is true for "A" position pixel bits and false for "B" position pixel bits, a1 is the pixel bit immediately above the input_bit, a2 is the pixel bit two pixels above the input_bit, a3 is the pixel bit three pixels above the input_bit, b1 is the pixel bit immediately below the input_bit, b2 is the pixel bit two pixels below the input_bit, and b3 is the pixel bit three pixels below the input_bit. Pixels a1-3 and b1-3 represent the values/states of these pixels before being altered by the present method. For multiple color planes, the bit map of each of the color planes is processed by the present method independently of the others.

It will be appreciated that other implementations of the present method are possible, such as utilizing the following truth table as a look up table:

|  | | | | | | | | | | | | | | | | |
|---|---|---|---|---|---|---|---|---|---|---|---|---|---|---|---|---|
|  | x | x | x | x | x | x | x | x | x | x | x | x | x | 0 | 1 | x |
|  | x | x | x | x | x | x | x | x | x | x | x | 0 | 1 | 0 | 0 | 1 |
|  | x | 0 | 0 | 0 | 1 | x | 0 | 1 | 1 | 0 | 1 | 1 | 1 | 1 | 1 | 1 |
| Input "A": | 0 | 0 | 0 | 0 | 0 | 1 | 1 | 1 | 1 | 1 | 1 | 1 | 1 | 1 | 1 | 1 |
| Input "B": | 0 | 1 | 1 | 1 | 1 | 0 | 0 | 0 | 0 | 1 | 1 | 1 | 1 | 1 | 1 | 1 |
|  | x | 0 | 1 | 1 | x | 0 | 1 | 1 | 1 | x | 0 | 0 | 0 | 1 | 1 | 1 |
|  | x | x | 0 | 1 | x | x | x | 0 | 1 | x | 0 | x | 1 | x | x | x |
| Output "A": | 0 | 0 | 0 | 0 | 0 | 1 | 1 | 1 | 0 | 1 | 0 | 0 | 1 | 0 | 1 | 1 |
| Output "B": | 0 | 1 | 0 | 1 | 0 | 0 | 0 | 0 | 0 | 0 | 1 | 1 | 0 | 0 | 0 | 0 |

In the above table each vertical column represents a different configuration of adjacent "A" and "B" Input pixels in the PostScript®-generated bit map and the same "A" and "B" Output pixels after processing by the present method. The other input pixels surrounding the "A" and "B" Input pixels are shown as context for the "A" and "B" Input pixels being processed. Those other input pixels that are not examined by the present method for a particular configuration are shown as "x".

The foregoing description of a preferred embodiment of the invention has been presented for purposes of illustration and description. It is not intended to be exhaustive or to limit the invention to the precise form disclosed. The terms and expressions which have been employed in the foregoing specification are used therein as terms of description and not of limitation. The use of such terms and expressions is not intended to exclude equivalents of the features shown and described or portions thereof. Many changes, modifications, and variations in the steps and procedures can be made, and the invention may be utilized with various different printing apparatus, other than solid ink offset printers, all without departing from the inventive concepts disclosed herein.

The preferred embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when the claims are interpreted in accordance with breadth to which they are fairly, legally, and equitably entitled. All patents cited herein are incorporated by reference in their entirety.

What is claimed is:

1. A method of increasing resolution in an image printed on a receiving surface and represented by a plurality of pixels in a bit map, each of the pixels being in either a first state or a second state, the first state representing an ink drop of a color and the second state representing no ink drop of a color, the pixels being arranged in single-pixel wide columns, the method comprising the steps of:
   a. determining whether a first pixel in the plurality of pixels is in the first state;
   b. maintaining the first pixel in the first state if the first pixel is in the first state and is between at least two pixels in the first state and at least two pixels in the second state within the same column as the first pixel;
   c. changing a portion of the plurality of pixels in the bit map from the first state to the second state such that no two adjacent pixels in a column are in the first state; and
   d. repeating steps a, b and c for each of the plurality of pixels as the first pixel to produce a processed bit map that is utilized to print the image on the receiving surface.

2. The method of claim 1 further comprising the step of designating every other pixel in an interior section of a solid fill area as a restricted pixel whose state cannot be changed, the interior section being defined as at least one pixel in the first state that is between at least two pixels in the first state and at least two pixels in the first state within the same column, whereby the restricted pixels are not changed from the first state to the second state.

3. The method of claim 2 wherein the columns of pixels are positioned side by side and alternate between odd numbered columns and even numbered columns, each of the columns having an odd first pixel location and alternating thereafter between even and odd pixel locations, and wherein the step of designating as a restricted pixel every other pixel in the interior section further comprises the steps of:
   limiting restricted pixels to the odd pixel locations in the odd numbered columns; and
   limiting restricted pixels to the even pixel locations in the even numbered columns, whereby the restricted pixels form a checkerboard pattern in the solid fill area.

4. The method of claim 3, wherein step c does not change a first state pixel to the second state if the first state pixel is between at least two pixels in the second state and at least two pixels in the second state.

5. The method of claim 4, wherein each pixel has a first side and an opposing second side, the method further comprising the steps of:
   changing a first state pixel to the second state if the first state pixel is in an odd pixel location in an odd numbered column, the first state pixel has at least one neighboring pixel in the first state immediately adjacent on the first side, the first state pixel has one neighboring pixel in the second state immediately adjacent on the second side, and the one neighboring second state pixel has at least two pixels in the first state immediately adjacent on its second side; and
   changing a first state pixel to the second state if the first state pixel is in an even pixel location in an even numbered column, the first state pixel has at least one neighboring pixel in the first state immediately adjacent on the first side, the first state pixel has one neighboring pixel in the second state immediately adjacent on the second side, and the one neighboring second state pixel has at least two pixels in the first state immediately adjacent on its second side.

6. The method of claim 5, further comprising the steps of:
   maintaining a first state pixel in the first state if the first state pixel is in an odd pixel location in an odd numbered column and the first state pixel is between one neighboring pixel in the first state and at least two neighboring pixels in the second state, and the one neighboring pixel in the first state is adjacent to at least two pixels in the second state; and
   maintaining a first state pixel in the first state if the first state pixel is in an even pixel location in an even numbered column and the first state pixel is between one neighboring pixel in the first state and at least two neighboring pixels in the second state, and the one neighboring pixel in the first state is adjacent to at least two pixels in the second state.

7. The method of claim 6, further comprising the step of aligning a half-tone screen to the processed bit map to prevent discontinuities between the solid fill areas and a shaded area.

8. The method of claim 7, further comprising the step of using a sequence of AND, OR and NOT operations on at least 32 pixels at a time to execute the method.

9. The method of claim 8, further comprising the step of processing one column of pixels at a time while ignoring information from adjacent columns.

10. The method of claim 9, further comprising the step of utilizing the method to print an image with a color ink jet printer.

11. The method of claim 10, further comprising the steps of:
    jetting liquid ink from a print head onto an intermediate transfer surface in accordance with the processed bit map to form the image thereon; and
    fusing the image to a final receiving medium.

12. The method of claim 11, further comprising the step of moving the print head and the intermediate transfer surface in substantially transverse directions as the liquid ink is jetted from the print head.

13. The method of claim 9, further comprising the step of utilizing the method to print an image directly onto a final receiving medium with an ink jet printer that incorporates a shuttling print head.

* * * * *